(12) United States Patent
Ayala

(10) Patent No.: US 7,493,295 B2
(45) Date of Patent: Feb. 17, 2009

(54) METHOD, SYSTEM AND COMPUTER PROGRAM FOR DEVELOPING CORTICAL ALGORITHMS

(75) Inventor: Francisco J. Ayala, 6715 Woodland Dr., Dallas, TX (US) 75225

(73) Assignee: Francisco J. Ayala, Dallas, TX (US)

(*) Notice: Subject to any disclaimer, the term of this patent is extended or adjusted under 35 U.S.C. 154(b) by 144 days.

(21) Appl. No.: 10/907,417

(22) Filed: Mar. 31, 2005

(65) Prior Publication Data

US 2005/0256814 A1    Nov. 17, 2005

Related U.S. Application Data

(63) Continuation-in-part of application No. 10/755,946, filed on Jan. 13, 2004, now Pat. No. 7,139,740.

(60) Provisional application No. 60/440,883, filed on Jan. 17, 2003.

(51) Int. Cl.
*G06E 3/00* (2006.01)
*G06F 15/18* (2006.01)

(52) U.S. Cl. ............................... 706/26; 706/3; 706/16

(58) Field of Classification Search .................... 706/26, 706/3, 16, 47, 49
See application file for complete search history.

(56) References Cited

U.S. PATENT DOCUMENTS

| | | | |
|---|---|---|---|
| 4,979,126 A | 12/1990 | Pao et al. | |
| 4,994,982 A | 2/1991 | Duranton et al. | |
| 5,093,899 A | 3/1992 | Hiraiwa | |
| 5,136,686 A * | 8/1992 | Koza | 706/13 |
| 5,140,530 A | 8/1992 | Guha et al. | |
| 5,214,746 A | 5/1993 | Fogel et al. | |
| 5,245,696 A * | 9/1993 | Stork et al. | 706/13 |
| 5,249,259 A | 9/1993 | Harvey | |
| 5,283,855 A | 2/1994 | Motomura et al. | |
| 5,349,646 A | 9/1994 | Furuta et al. | |
| 5,375,250 A | 12/1994 | Van den Heuvel | |

(Continued)

FOREIGN PATENT DOCUMENTS

WO    WO 90/11568 A    10/1990

(Continued)

OTHER PUBLICATIONS

Kobayashi et al., "A New Indirect Encoding Method with Variable Length Gene Code to Optimize Neural Network Structures", IEEE, IJCNN, Jul. 1999.*

(Continued)

*Primary Examiner*—David R Vincent
*Assistant Examiner*—Adrian L Kennedy
(74) *Attorney, Agent, or Firm*—Gardere Wynne Sewell LLP

(57) ABSTRACT

A system, method and computer program for developing artificial intelligence through the generational evolution of one or more genomes. Each genome includes a set of functions. The method includes creating one or more cortices, operating the one or more cortices to perform one or more specified tasks, calculating a fitness score for each cortex based on its ability to perform the specified tasks, and selecting one or more of the cortices based on the respective fitness scores. Each cortex includes a plurality of cortical units. Each cortical unit includes a set of functions. Each cortical unit is created from the one or more genomes.

40 Claims, 8 Drawing Sheets

U.S. PATENT DOCUMENTS

| | | | |
|---|---|---|---|
| 5,398,302 A | 3/1995 | Thrift | |
| 5,400,436 A | 3/1995 | Nara et al. | |
| 5,402,522 A | 3/1995 | Alkon et al. | |
| 5,428,710 A | 6/1995 | Toomarian et al. | |
| 5,452,402 A | 9/1995 | Sakiyama et al. | |
| 5,455,891 A | 10/1995 | Hirotsu et al. | |
| 5,459,817 A | 10/1995 | Shima | |
| 5,485,601 A * | 1/1996 | Ching | 717/106 |
| 5,515,477 A | 5/1996 | Sutherland | |
| 5,566,273 A | 10/1996 | Huang et al. | |
| 5,568,590 A | 10/1996 | Tolson | |
| 5,590,218 A * | 12/1996 | Ornstein | 382/157 |
| 5,617,483 A | 4/1997 | Osawa | |
| 5,633,988 A | 5/1997 | Takatori et al. | |
| 5,640,494 A | 6/1997 | Jabri et al. | |
| 5,704,016 A | 12/1997 | Shigematsu et al. | |
| 5,717,832 A | 2/1998 | Steimle et al. | |
| 5,720,002 A | 2/1998 | Wang | |
| 5,729,662 A | 3/1998 | Rozmus | |
| 5,761,381 A * | 6/1998 | Arci et al. | 706/13 |
| 5,812,992 A | 9/1998 | de Vries | |
| 5,832,466 A | 11/1998 | Feldgajer | |
| 5,835,901 A | 11/1998 | Duvoisin, III et al. | |
| 5,841,949 A | 11/1998 | Nakaya et al. | |
| 5,864,832 A | 1/1999 | Meyers | |
| 5,870,728 A | 2/1999 | Yatsuzuka et al. | |
| 5,870,729 A | 2/1999 | Yoda | |
| 5,920,851 A | 7/1999 | Muller | |
| 5,930,781 A | 7/1999 | Toomarian et al. | |
| 5,937,432 A | 8/1999 | Yamaguchi et al. | |
| 5,974,404 A | 10/1999 | Moed et al. | |
| 6,038,338 A | 3/2000 | Nguyen | |
| 6,151,592 A | 11/2000 | Inazumi | |
| 6,205,556 B1 | 3/2001 | Watanabe et al. | |
| 6,269,351 B1 | 7/2001 | Black | |
| 6,349,293 B1 | 2/2002 | Yamaguchi | |
| 6,366,897 B1 | 4/2002 | Means et al. | |
| 6,415,272 B1 | 7/2002 | Ulyanov | |
| 6,424,961 B1 | 7/2002 | Ayala | |
| 6,449,603 B1 | 9/2002 | Hunter | |
| 6,493,686 B1 * | 12/2002 | Francone et al. | 706/12 |
| 6,516,309 B1 | 2/2003 | Eberhart et al. | |
| 6,523,016 B1 * | 2/2003 | Michalski | 706/12 |
| 6,553,357 B2 | 4/2003 | Mathias et al. | |
| 6,601,053 B1 | 7/2003 | Schaffer et al. | |
| 6,658,645 B1 * | 12/2003 | Akuta et al. | 717/106 |
| 7,139,740 B2 | 11/2006 | Ayala | |
| 2002/0059154 A1 | 5/2002 | Rodvold | |
| 2002/0069036 A1 * | 6/2002 | Mizokawa | 702/182 |
| 2002/0082065 A1 * | 6/2002 | Fogel et al. | 463/8 |
| 2002/0138246 A1 * | 9/2002 | Czora | 703/22 |
| 2003/0004904 A1 * | 1/2003 | Krishenbaum | 706/13 |
| 2003/0014378 A1 | 1/2003 | Goodnight et al. | |
| 2003/0018598 A1 | 1/2003 | Cawse et al. | |

FOREIGN PATENT DOCUMENTS

| | | |
|---|---|---|
| WO | WO 01/16881 A2 | 3/2001 |
| WO | WO 01/16881 A3 | 3/2001 |

OTHER PUBLICATIONS

Harter, D., et al., 2001; "Models of Ontogenetic Development for Autonomous Adaptive Systems"; Proceedings of the 23rd Annual Conference of the Cognitive Science Society, pp. 405-405.*

J.R. Koza, et al., "Evoloving Inventions"; Scientific American; 2003; pp. 52-59.*

C.O. Willke et al., "Evolution of Digital Organisms at High Mutation Rates Leads to Survival of the Flattest"; Nature, vol. 412, Jul. 19, 2001; 331-333.*

R.E. Lenski et al., The Evolutionary Origin of Complex Features; Nature, vol. 423, May 8, 2003; pp. 139-144.*

International Search Report for Co-Pending Related PCT Application No. PCT/US2006/010813, Mailing Date—Nov. 8, 2007.

Wasserman et al., "Neural Networks, Part 2:" IEEE Expert, 1988.

Scalero et al., "A Fast New Algorithm for Trainging Feedforward, Neural Networks", IEEE Transactions on Signal Processing, Jan. 1992.

Dasgupta et al., "Designing Application-Specific Neural Networks using the Stuctured Genetic Algorithm", Department of Computer Science, University of Strathclyde, IEEE Computer Society Press, Jun. 6, 1992.

Lee et al., "Evolutionary Ordered Neural Network with a Linked-list Encoding Scheme", Department of Electrical Engineering, May 20-22, 1996.

Kbayashi et al., "A New Indirect Encoding Method with Variable Length Gene Code to Optimize Neural Network Structures", IEEE, IJCNN, Jul. 1999.

Hallinan, J., et al., 1998 "Cooperative Evolution of a Neural Classifier and Feature Subset"; Proc. $2^{nd}$ Asia-Pacific Conference on Simulated Evolution and Learing.

Harter, D., et al., 2001; "Models of Ontogenetic Development for Autonomous Adaptive Systems"; Proceedings of the $23^{rd}$ Annual Conference of the Cognitive Science Society, pp. 405-410.

Hochman, R., et al., 1996; "Using the Genetic Algorithm to Building Optimal Neural Networks for Fault-Prone Module Detection"; In Proc. the Seventh Int. Symposium on Software Reliablity Engineering, pp. 152-162; White Plains, N.Y.

Keane, M.A., et al., 2002; Automatic Using Genetic Programming of an Imporved General-Purpose Controller for Industrially Representative Plants; Evolvable Hardware, 2002; pp. 113-122.

Michel, O., 1995; An Artificial Life Approach for the Synthesis of Autonomous Agents; In J. Alliot, E. Lutton, E. Ronald, M. Schoenauer, and D. Snyers (Eds.), Proceedings of the European Conference on Artificial Evolution, Spring-Verlag.

Kaelbling, L.P., et al., Reinforcement Learning: A Survey, (1996), Journal of Artificial Intelligence Research 4: 237-285.

Touretzky, D.S., et al., (1997) Operant Conditioning in Skinnerbots. Adaptive Behavior 5:219-247.

Byoung-Tak Zhang et al., Evolutionary Induction of Sparse Neual Trees, Evolutionary Computation, 1997, vol. 5, No. 2, pp. 213-236.

Byoung-Tak Zhang et al., Evolutionary Neural Trees for Modeling and Predicting Complex Systems; Engng, Applic. Artif. Intell. vol. 10, No. 5, pp. 473-483, 1997.

Koza, John R., 1989, Hierarchical Genetic Algorithms Operating on Populations of Computer Programs, Reprinted: Computer-Science Department, Stanford University, Stanford, CA; pp. 578-584.

F. Pasemann; "Pole-Balancing with Different Evolved Neurocontrollers"; Max-Planck-Institute for Mathematics in the Sciences, D-04103 Leipzig, Germany; pp. 1-7.

J.R. Koza, et al., "Evolving Inventions"; Scientific American; 2003; pp. 52-59.

H. Lipson et al, "Automatic Design and Manufacture of Robotic Lifeforms"; Nature, vol. 406, Aug. 31, 2000; pp. 974-978.

C.O. Willke et al., "Evolution of Digital Organisms at High Mutation Rates Leads to Survival of the Flattest"; Nature, vol. 412, Jul. 19, 2001; pp. 331-333.

R.E. Lenski et al., "The Evolutionary Origin of Complex Features"; Nature, vol. 423, May 8, 2003; pp. 139-144.

Y. Shigematsu et al., "A dynamic Neural Cell Model Driven by Pulse Train"; Electotechnical Laboratory; Umezono Tsukuba Ibaraki Japan; pp. 130-133.

K.E. Kinnear, Jr., "Derivative Methods in Gentic Programming"; 'Evolutionary Computation 1, Basic Algorithms and Operators', Beck T. et al (eds) 2000; Institute of Physics Publishing, Bristol; pp. 102-113.

P.J. Angeline; "Parse Trees"; Evolutionary Computation 1, Basic Algorithms and Operators, Beck T. et al (eds) 2000; Institute of Physics Publishing, Bristol; pp. 155-159.

D. Tveter, "The PAttern Recognition Basis of Artificial Intelligence".

S.L. Blyumin et al., "Reduction of Adjusting Weights Space Dimension in Feedforward Artificial Neural Networks" Training; IEEE International Conference on Artificial Intelligence Systems; Sep. 5-10, 2002; p. 242.

S.S. han et al., "Optimization of Neural Network Structure and Learning Parameters Using Genetic Algorithms"; 8th International Conference on Tools with Artificial Intelligence; Nov. 16-19, 1996; Toulousse, France; p. 200.

T. Zhuang et al., "A Neuron-Weighted Learning Algorithms and its Hardware Implementations in Associative Memories"; IEEE Transactions on Computers, 1993; pp. 636-640.

N.P. Archer et al., "Learning Bias in Neural Networks and an Approach to Controlling its Effects in Monotonic Classification"; IEEE Transactions on APtttern Analysis and Machine Intelligence; 1993; pp. 962-966.

A.K. Bansal, "Establishing a Framework for Comparative Analysis of Genome Sequences", IEEE First International Symposium on Intelligence in Neural and Biological Systems; May 29-31, 1995; p. 84.

M. Hilario et al., "A Metalevel Architecture for Knowledge-Based Neural Network Design"; IEEE 9th International Conference on Tools with Artificial Intelligence; Nov. 2-8, 1997.

Hampton, A.N. and C. Adami (2004), "Evolution of Robust Developmental Neural Networks"; Arxiv.org archive (http://arxiv.org/pdf/nlin.A0/0405011).

K. Kobayashi and M. Ohbayshi, "A New Indirect Encoding Method with Variable Length Gene Code to Optimize Neural Network Structures"; IEEE Xplore, 0-7803-5529, Jun. 1999.

Mehrotra et al., "Elements of Artificial Neural Networks", 0-262-13328-8.

International Search Report, PCT/US04/00731, Mailing Date of Mar. 15, 2005.

Chin-Teng Lin et al.; "Controlling Chaos by GA-Based Reinforcement Learning Neural Network"; IEEE Transactions of Neural Networks, vol. 10, No. 4, Jul. 1999; pp. 846-859.

Frederic Gruau; "Genetic Synthesis of Modular Neural Networks"; Jul. 17, 1993; pp. 318-325.

Supplementary European Search Report; EP 04 70 1745; Sep. 3, 2007.

* cited by examiner

301

```

##((((@N12 + (1.0 + @N0)) + @N14) + @PR0) + (@PRL + 0.0))
##(@D2 + 1.0)
##(@X)
##(1.0)
##((@N1 + 1.0) $MOD (@N11 + 1.0))
##((((@D3 + @N5) + @D7) + @N6) + 1.0)
```
303
```
##(0.0 + (((1.0 + 1.0) $MOD @D13) + @D1))
##((1.0 + @D12) + @NRL)
##(@R1)
##(1.0)
##(((1.0 + 1.0) + @N10) + @Y)
##(1.0)
##(1.0 + (1.0 + 1.0))
##(@N8 + 1.0)
##(((1.0 + 1.0) + @N5) + @D10)
##(1.0)

```

301a

```

##((1.0 + (1.0 $TRI @D14)) + 1.0)
##( $ABS @N2)
##(1.0 + (2.0 + @N1))
##(1.0)
##((1.0 $NEG ) $EXP @D15)
##(1.0 + (12.0 $ST2 ))
##(1.0)
##(@N7)
##(-6.3579 $RAD 1.0)
##(0.0 + (@PR0 + (@D11 $STY )))
##(1.0)
##(1.0)
##(1.0)
##(@N13)
##(@R2 + 1.0)
##(1.0)

```

Figure 3

METHOD, SYSTEM AND COMPUTER PROGRAM FOR DEVELOPING CORTICAL ALGORITHMS

CROSS REFERENCE TO RELATED APPLICATIONS

The present application is a continuation-in-part of and claims priority to co-pending U.S. patent application Ser. No.10/755,946, now U.S. Pat. No. 7,139,740 entitled "System and Method for Developing Artificial Intelligence," filed in the U.S. Patent and Trademark Office on Jan. 13, 2004 and having a common inventor as the present document, which claims priority to U.S. provisional application Ser. No. 60/440,883 filed in the U.S. Patent and Trademark Office on Jan. 17, 2003. All of the above provisional and non-provisional patent applications are hereby incorporated by reference.

BACKGROUND OF THE INVENTION

The present invention relates to artificial intelligent algorithms and more particularly to a system, method and computer program for developing cortical algorithms that are capable of learning and problem solving.

DISCUSSION OF THE BACKGROUND

Ever since the introduction of the computer in the 1940s, there has been intense interest devoted to artificially replicating one of the human mind's highest faculties-intelligence. This branch of computer science is known as artificial intelligence (AI), and its goal is to produce a machine that exhibits characteristics associated with human intelligence, such as language comprehension, problem solving, pattern recognition, learning, and reasoning from incomplete or uncertain information.

In the decades of research, the major approach into artificial intelligence has been and still remains the development of increasingly complex computer code, faster computer hardware, and larger memories, databases, and knowledge bases. With this technology, artificial intelligence researchers have developed expert systems that perform well at specific tasks, such as playing chess or diagnosing medical conditions, as long as the procedures and objectives are precisely defined and do not change. Regardless of their sophistication, however, the capabilities of these systems reflect the intelligence of the designers, not the intelligence of the systems themselves.

The DEEP BLUE™ computer chess system developed by IBM™ is a case in point. The DEEP BLUE™ system employed a combination of computationally intensive brute-force searching of possible chess positions for several moves ahead, sophisticated scoring and searching heuristics, and a database of openings and end-games that was able to defeat the world's top-rated human chess player at the time. What chess audiences had witnessed, however, was merely a triumph of brute force computation to solve a particular problem, not a feat of general intelligence. As a test of machine intelligence, chess might seem like a reasonable choice, because the ability to play chess in humans is a strong indicator of the ability to apply one's intellect to other complex problems. However, a human capable of playing a good game of chess but incapable of solving basic problems in other areas would not be considered intelligent so much as autistic. The DEEP BLUE™ system has no other capabilities outside of chess, and its success in chess does not translate to success in achieving general intelligence.

Accordingly, programming computers to mimic a particular task is unlikely to achieve genuine artificial intelligence, no matter how skilled their programmers become at devising algorithms to solve clearly-defined problems. One reason for the shortcomings of this approach is that it models only the outward behaviors of intelligence, not its underlying dynamics. Playing grandmaster level chess is a behavior of intelligent humans, but what makes them intelligent is how they think about chess. In some cases, simulating a few relevant behaviors of a system is sufficient for a practical, artificial alternative. Artificial turf, for instance, is a practical substitute for grass as a green playing surface for football, but if artificial turf is expected to photosynthesize, attract wildlife, or introduce nutrients into the soil, then green pieces of plastic polymers woven through webbed rubber lattices is a poor design. To create intelligence, it is desirable to model not just some of the behaviors of human brains, but how human brains do it.

Unfortunately, the human brain is too complex to model its dynamics directly by duplicating its structure and low-level functions. For example, the human brain is an intricate network of millions of interconnected neurons. The region responsible for intelligence, the cerebral cortex, itself has several dozen different areas, and each area has approximately six different layers. Each layer has its own composition of several different types of neurons, and each type of neuron responds to input stimuli in its own way with its own characteristic firing rate and intensity. The types, arrangements, and dynamics of neurons and the connections between neurons show enormous variation across the layers, areas, and regions of the brain. Although the neuroscientific literature is rich with descriptions of the different neurons and connection types, there are as yet no successful theories of how the mind emerges from the inner workings of the brain. Without understanding how the brain achieves intelligence, artificial intelligence researchers are having a very hard time reproducing intelligence by mimicking the brain.

Even simplified models of the human brain have not been successful for attaining general intelligence. For example, one approach is to simulate the action of the human brain by using artificial neural networks, consisting of connected "artificial neurons" arranged in layers. Each layer is fully interconnected and signal processing is feed-forward, meaning that each artificial neuron in a given layer receives input signals from every artificial neuron in the previous layer and transmits an output signal to every artificial neuron in the next layer. Each artificial neuron produces output as a function of the weighted sum of its inputs, and the output of the artificial neural network as a whole depends on all the connection weights.

Artificial neural networks operate in two successive stages: programming and execution. In the programming stage, the artificial neural network is trained by applying a set of training patterns, such as letters of an alphabet for optical character recognition, and adjusting the connection weights of all the artificial neurons until the appropriate outputs are produced. When the programming stage is complete, the artificial neural network is ready for the execution stage, in which the artificial neural network is used to classify inputs applied to the artificial neural network in relation to the patterns previously presented in the training set. Artificial neural networks have had some success in recognizing and classifying patterns, especially in hand writing and other character recognition applications, and they are often very robust with respect to noisy data. However, once an artificial neural network enters the execution stage, its capability to recognize new patterns is fixed until its connection weights are completely reprogrammed on a new training set. For example, if the artificial neural network had been trained to optically recognize characters of an alphabet, augmenting the alphabet with a new character requires the connection weights in the artificial neural network to be reset and retrained from scratch.

Because of this inherent limitation, artificial neural networks, despite their superficial and terminological resemblance to biological neural systems, show little promise of progressing over other approaches to artificial intelligence. While artificial neural networks and expert systems are programmed differently, the result is fundamentally the same—a relatively static system that executes a precise and predetermined series of calculations but which cannot learn or exhibit other signs of intelligence.

Thus, there exists a need for a learning and problem solving capability in artificial intelligent systems that is dynamic, general-purpose, and adaptable to unexpected challenges in a changing environment.

SUMMARY OF THE INVENTION

Accordingly, one object of the present invention is to provide a method for developing artificial intelligence through the generational evolution of one or more genomes. Each genome includes a set of functions. The method includes creating one or more cortices, operating the one or more cortices to perform one or more specified tasks, calculating a fitness score for each cortex based on its ability to perform the specified tasks, and selecting one or more of the cortices based on the respective fitness scores. Each cortex includes a plurality of cortical units. Each cortical unit includes a set of functions. Each cortical unit is created from the one or more genomes.

Another object of the present invention is to provide a computer program for developing artificial intelligence through the generational evolution of one or more genomes. Each genome includes a set of functions. The computer program includes first, second, third and forth computer codes. The first computer code creates one or more cortices. The second computer code operates the one or more cortices to perform one or more specified tasks. The third computer code calculates a fitness score for each cortex based on its ability to perform the specified tasks. The forth computer code selects one or more of the cortices based on the respective fitness scores. Each cortex includes a plurality of cortical units. Each cortical unit includes a set of functions. Each cortical unit is created from the one or more genomes.

Yet another object of the present invention is to provide a computer system for developing artificial intelligence through the generational evolution of one or more genomes. Each genome includes a set of functions. The computer system includes one or more processors and a computer readable medium connected to the processors. The computer readable medium includes processor instructions configured to be read by the processors and thereby cause the processors to create one or more cortices, operate the one or more cortices to perform one or more specified tasks, calculate a fitness score for each cortex based on its ability to perform the specified tasks, and select one or more of the cortices based on the respective fitness scores. Each cortex includes a plurality of cortical units. Each cortical unit includes a set of functions. Each cortical unit is created from the one or more genomes.

Another object of the present invention is to provide a method for developing artificial intelligence through the generational evolution of one or more sets of functions. The method includes creating one or more first objects, operating the first objects to perform one or more specified tasks, reproducing one or more of the sets of functions, and mutating one or more of the functions. Each first object includes a plurality of second objects, and each second object is created from one of the sets of functions. A fitness score is calculated for each first object based on its ability to perform the specified tasks. Each set of functions is reproduced based on the fitness scores of the corresponding first objects that have second objects created by that set of functions.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIG. 3 shows exemplary genomes according to an embodiment of the present invention;

DETAILED DESCRIPTION OF THE PREFERRED EMBODIMENTS

Figure 1A:
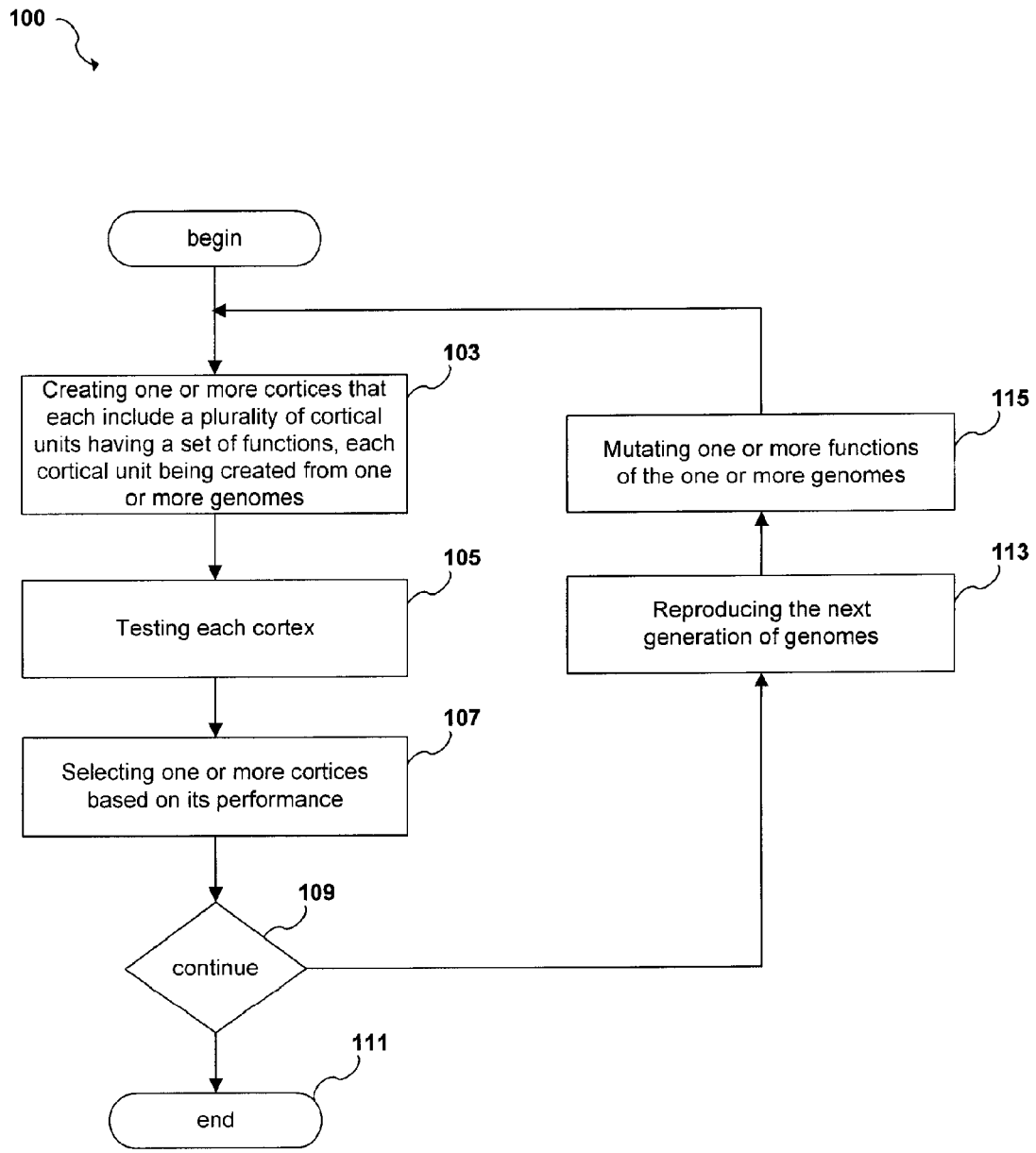
FIG. 1a is a flow chart illustrating an overview of a process for developing artificial intelligence using virtual evolution according to an embodiment of the present invention.

Referring now to the drawings, wherein like reference numerals designate identical or corresponding parts throughout the several views, preferred embodiments of the present invention are described.

The present invention pertains to an effort to produce genuine artificial intelligence, instead of merely attempting to replicate a specific result of evolution or to perform specified tasks. In the present invention, evolution itself is used to develop systems that exhibit intelligence. The long-standing frustrations in artificial intelligence research are addressed by subjecting generations of adaptive cortices to a competitive, rigorous selection regime in which fitness is judged by intelligence. The result of this process is an array of interconnected cortical units, collectively known as a cortex, displaying characteristics of artificial intelligence.

I. Virtual Evolution

The quest for artificial intelligence is not a mirage: genuine intelligence has been produced once, by evolution. While the understanding of the mechanisms underlying intelligence is still in its infancy, comprehension of the mechanisms underlying evolution—mutation, selection, and reproduction—is as mature as any other field of science. Accordingly, one aspect of the invention relates to harnessing the evolutionary mechanisms that have produced genuine intelligence once to produce intelligence again.

Referring to FIG. 1a, a flow chart illustrating an overview of a process for developing artificial intelligence using virtual evolution according to an embodiment of the present invention is shown. The process includes creating one or more new cortices that each include a plurality of cortical units having a set of functions, each cortical unit being created from one or more genomes, at block 103; testing each cortex at block 105; selecting one or more cortices based on the performance of the cortex at block 107; continuing or terminating the virtual evolution process at block 109; reproducing the next generation of genomes at block 113; and mutating one or more functions of the one or more genomes at block 115.

As shown at block 103, one or more new cortices that each include a plurality of cortical units are created. Each cortical unit is created from one or more genomes and includes a set of functions. Hereinafter, the term genome will be used to represent the blueprint of a cortical unit. In one possible embodiment, shown in FIG. 3, genomes (301 and 301a) each represent the blueprints for one or more cortical units. In this embodiment, "###" is used to identify the start and end for each of the genomes (301 and 301a). The blueprints for each function within genomes (301 and 301a) is prefixed by "##." For instance, the blueprint for function 303 is represented as a single line, prefixed by "##," in genome 301.

While the human cerebral cortex includes many different kinds of cortical neurons, the connections between these cortical neurons appear to be arranged in a pattern. The human cerebral cortex appears to consist of one vast array of neurons connected according this pattern. Indeed, no functional region of the human cerebral cortex appears to differ substantially from any other region in any anatomical or operational respect. Accordingly, in one embodiment of the present invention, each of the cortical units in the same cortex are created using the same genome and, thus, have an identical set of functions.

As shown at block 105, each cortex performs one or more specified task(s) during a trial period. System performance is continually monitored during the trial period, and positive and/or negative reinforcement signals, in response to the monitored performance, are applied as inputs to the cortical units. The procedure for testing a cortex is described in further detail below. At the end of the trial period, each cortex is assigned a fitness score corresponding to its performance of the one or more specified task(s). In one embodiment, the fitness of a cortex for performing the specific task(s) is computed from the applied reinforcement signals at the end of the trial period.

As shown at block 107, one or more cortices are selected. Selection is the process whereby some cortices are judged to be smarter than others, and the corresponding genomes of the smarter cortices are chosen over those less smart to populate the next generation. In one embodiment, the selected cortices are those with the highest accumulated ratio of PR:NR (an indicator of how fast and how well a cortex learns), measured over the course of training on tasks that require intelligence. After the fitness of each cortex exhibited in the selection trial has been determined, a subset of the cortices is selected that includes the more intelligent members in the population. One or more cortices are selected by comparing measured fitness levels of all of the cortices tested. Various ways to select cortices based on its measured fitness can be employed. For example, the selection can be based on rank order (e.g., the top 10 or top 10% most fit), absolute threshold (any cortex whose fitness measurement is greater than X), or stochastically (e.g., randomly selecting cortices weighted in accordance with the fitness measurements). Other methods may also be used in which the survival of cortices is positively correlated with the measured intelligence.

Unlike most evolutionary computation problems where quantitative comparisons of performance among the competing individuals are straightforward, the performance metrics in selecting for an abstract and general trait like intelligence are difficult to design. Nevertheless, some principles can be articulated. Individuals should be tested on their ability to adapt to changing environments, to make deductions and draw inferences, and to choose the most appropriate course of action from a wide range of alternatives. Above all, the individual should be able to learn how to do these things on its own, not by implementing specific instructions given to it by a programmer, but by continuously responding to positive and negative environmental feedback. The selection regime itself may become progressively more difficult as the population becomes progressively more capable, just as intelligence tests administered to ten-year-olds in middle school are more challenging than those administered to five-year-olds in kindergarten.

Step 109 pertains to the decision to continue or terminate the virtual evolution process. This decision may depend on different factors, including the number of generations produced, the amount of time spent, the intelligence fitness scores achieved, the monetary cost of the project, the evolution history, or the like. In fact, the virtual evolution may proceed indefinitely, with intelligent cortices being sampled from the current population on an as-needed basis. If the decision to terminate a run of virtual evolution is affirmative, then the process is complete (block 111), and cortices in the current population are ready for use in applications involving intelligence.

If, on the other hand, the virtual evolution process is to continue, then a next generation of genomes is generated at block 113 from the population of genomes that has survived the selection process at block 107. Reproduction involves copying at least one or more of the genomes, corresponding to the selected population of cortices, for the next generation. Because all of the genomes are not reproduced, some genomes become extinct through evolution because they do not survive the survival of the fittest selection process.

In one embodiment, the number of copies of a genome may be calculated using the formula:

$$c = \text{floor}\left(F_x \bigg/ \left(\sum_{n \in 0 \ldots N} F_n / N\right)\right)$$

where c refers to the number of copies, $F_x$ refers to the fitness score for a specified cortex, and N refers to the number of cortices being tested. Said in another way, the number of copies of a genome is equal to the floor function of the fitness score of a specified cortex divided by the average fitness score of all cortices being tested. The floor function merely returns the integer of a floating point number without rounding up (e.g., floor(1.955) is equal to 1). Optionally, genomes may be randomly selected to complete any array slots not filled using the formula described above.

The reproduction step (block 113) may optionally be combined with the following but conceptually distinct mutation step (block 115), in which new functions of the genomes or portions thereof are stochastically perturbed. Mutation can also involve recombination between two or more functions. Not every reproduced function or every portion thereof needs to be mutated, and, in fact, the mutation rate is preferably low enough to allow for intelligent genomes to persist in the population. In one embodiment, each possible mutation has a probability rate of that particular mutation occurring. The mutation rates themselves are also subject to mutation in that there is a probability that the mutation percentages may increase or decrease for the next generation.

After mutation, shown at block 115, the virtual evolution process loops back to block 103 where the next generation of cortices is subjected to the cycle of blocks 103-107, 113 and 115, as described above, until the termination condition in logic block 109 is triggered.

Figure 1B:
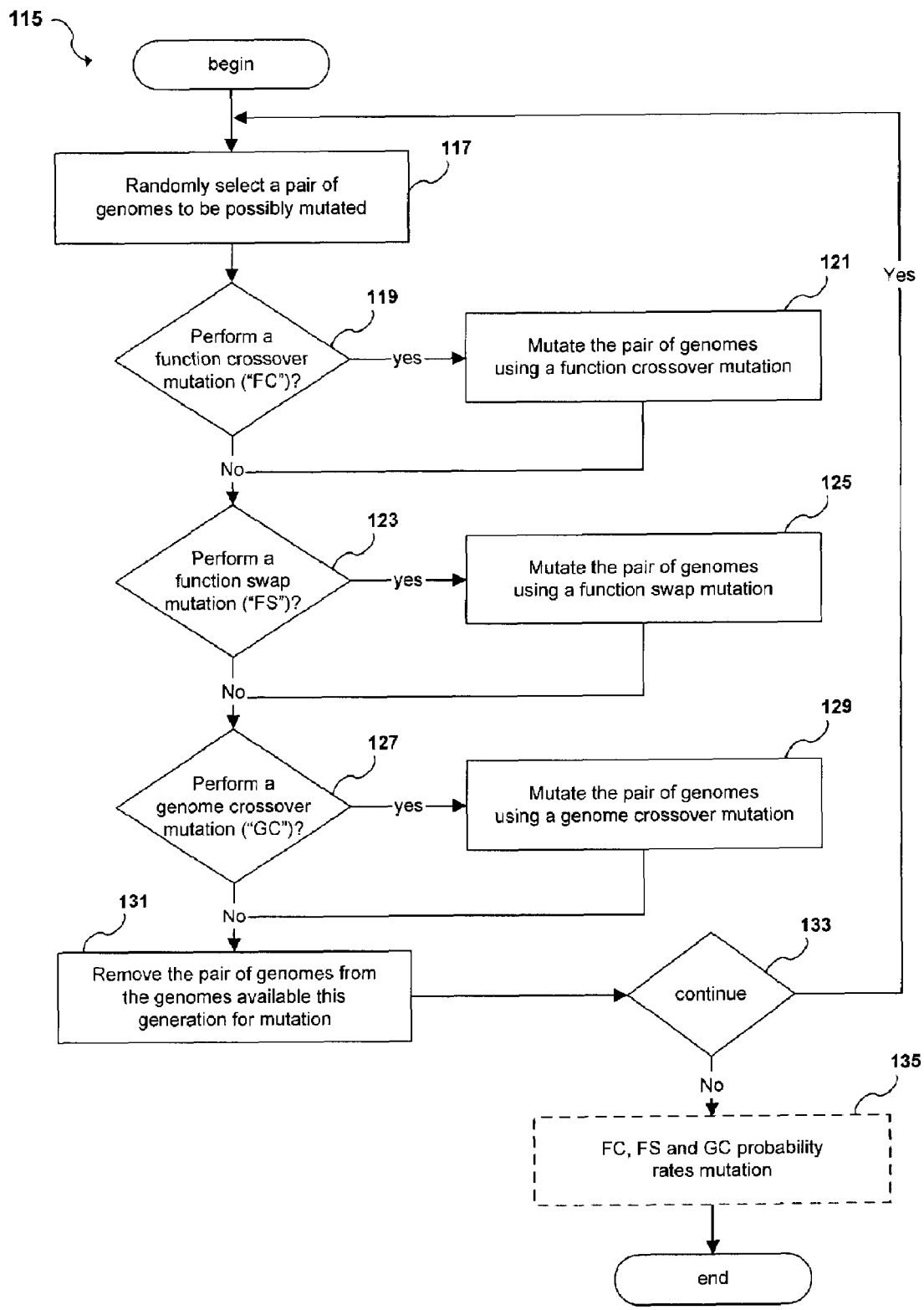
FIG. 1b is a flow chart illustrating mutating functions of genomes according to an embodiment of the present invention.

Referring to FIG. 1b, a flow chart illustrating mutating functions of genomes according to an embodiment of the present invention is shown. As shown at block 117, a pair of genomes are randomly selected from mutation candidates of the population of genomes. Initially all of the genomes copied from the reproduction step at block 113 are mutation candidates. At decision block 119, there is a random probability that a function crossover mutation ("FC") will occur based on a FC probability rate. If the random probability for the FC mutation occurs, then a FC mutation is performed on one or more functions of the genome pair, at block 121. At decision block 123, there is a random probability that a function swap mutation ("FS") will occur based on a FS probability rate. If the random probability for the FS mutation occurs, then a FS mutation is performed on one or more functions of the genome pair, at block 125. At decision block 127, there is a random probability that a genome crossover mutation ("GC") will occur based on a GC probability rate. If the random probability for the GC mutation occurs, then a GC mutation is performed on one or more functions of the genome pair, at block 129. As shown at block 131, the pair of genomes are removed from the mutation candidates, such that no further mutations will occur for this particular genome pair for the current generation. The mutation process loops back to block 117 where the next pair of genomes are selected from the mutation candidates, until the termination condition in logic block 133 is triggered. Optionally, there is also a random probability that the FC, FS and GC mutation probability rates may each mutate at block 135, allowing the rates to potentially increase or decrease after each generation.

II. The Genome

The present invention uses artificial evolution of one or more genomes. The set of functions of a genome may take many forms, for example they may be neural processing elements, parse trees, or any other kind of symbolic or mathematical expression. Each cortical unit and its set of functions, created from a genome, may also operate on many different variables. In one embodiment, logically the functions may be summarized by the following formulas:

$$N_0 = f_0(N_0 \ldots N_n, D_0 \ldots D_n, X, Y, NR, PR)$$

$$N_1 = f_1(N_0 \ldots N_n, D_0 \ldots D_n, X, Y, NR, PR)$$

$$N_n = f_n(N_0 \ldots N_n, D_0 \ldots D_n, DX, Y, NR, PR)$$

where $N_x$ refers to the output of function $f_x$, and the remaining variables refer to specific types of data that are available to these functions, as will be explained later.

In this embodiment, each function within a cortical unit has access to the same data. However, other embodiments may differ in this regard, such as within a neural network, in which data are accessed only through specified connections between various processing elements.

Data may be exchanged between functions of neighboring cortical units in a variety of ways including but not limited to exchanging data through neural connections, allowing the functions of one cortical unit access to another cortical unit's internal data, passing data between the cortical units, and using data that is global to all cortical units in the cortex. In this embodiment, $D_x$ refers to the value of $N_x$ of a specified neighboring cortical unit.

While every cortical unit within a cortex may be identical, the data upon which each cortical unit operates are not, since data are continuously processed and passed on in all directions to neighboring cortical units. The continuous flux of data processing throughout the entire cortex provides an opportunity for rich computational dynamics. These dynamics constitute a cortex's ability to think.

Environmental (e.g., sensory) data may be provided to the cortex and its corresponding cortical units in a variety of ways including but not limited to neural connections, and designating input variables upon which the functions may operate. In this embodiment, the X variable serves this purpose, with different environmental data streams assigned to the X variables of different cortical units. Optionally, all forms of environmental data may be transformed to a single specified data type, such as a floating point number, prior to their delivery to the cortical inputs.

Output data may be read from the cortex in a variety of ways including but not limited to designating the output of one or more functions, connections, or variables as cortical outputs. In this embodiment, the Y variable, set by the cortical unit in a manner described below, serves this purpose. One or more cortical units may be designated as output cortical units, and their Y variables will be read as the cortical outputs.

Figure 2A:
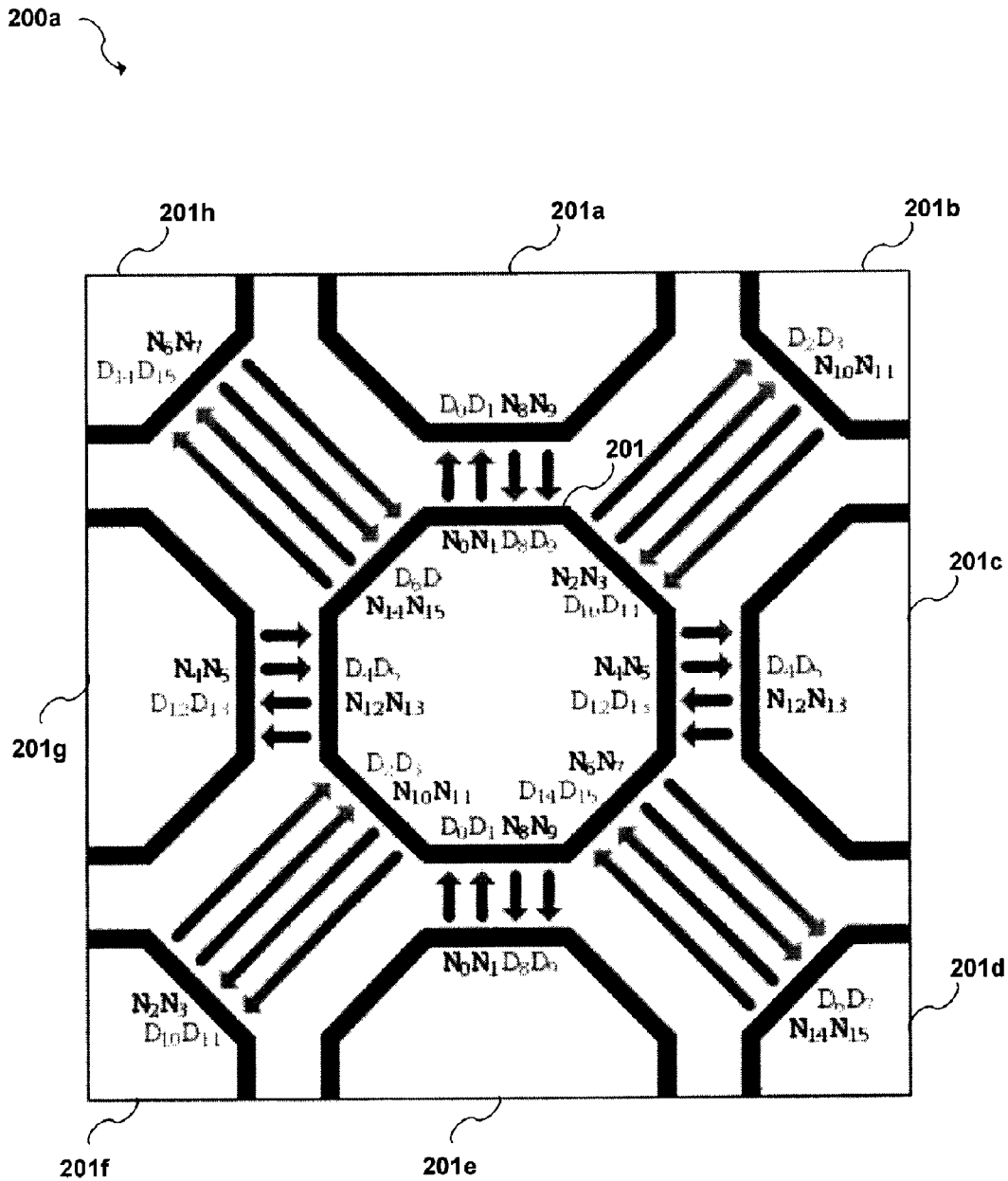
FIG. 2a graphically depicts cortical units according to an embodiment of the present invention.
Figure 2B:
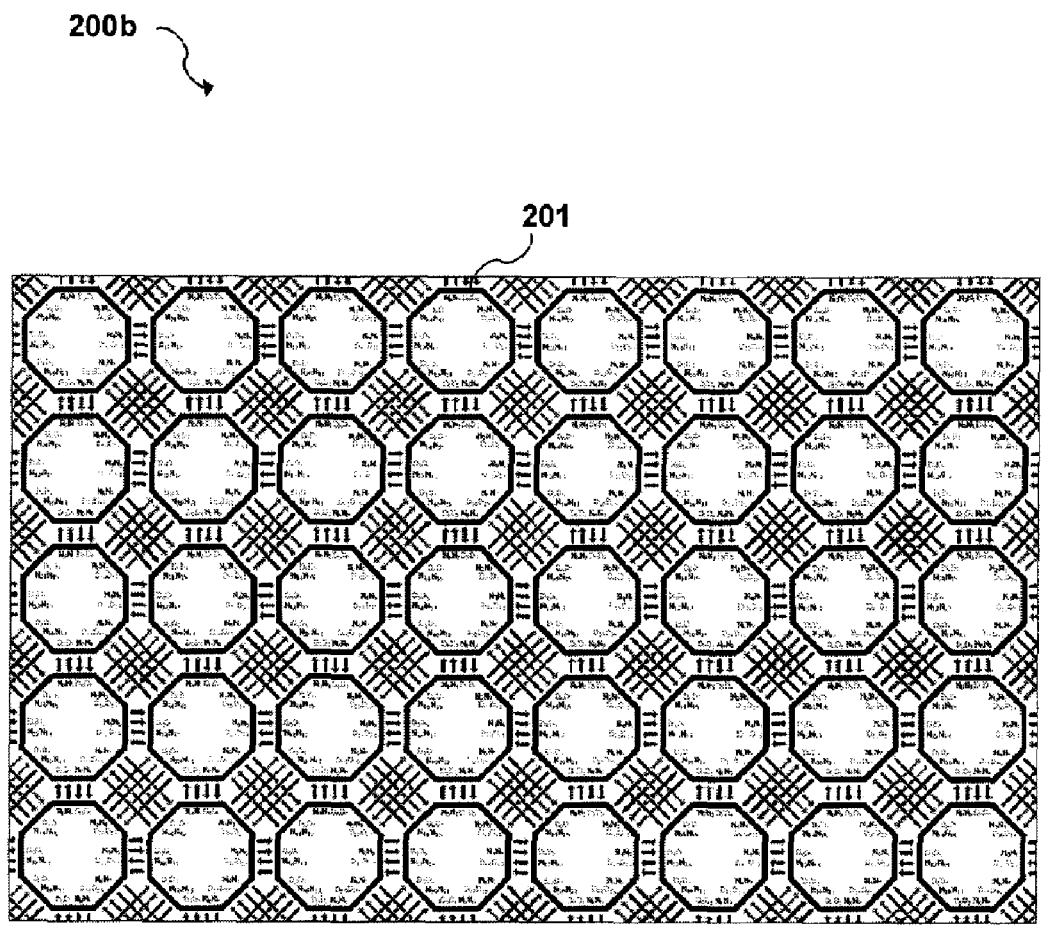
FIG. 2b graphically depicts an array of cortical units according to an embodiment of the present invention.

Referring to FIG. 2a, a cortical unit 201 interacting with one or more neighboring cortical units (201a-201h) according to an embodiment of the present invention is shown. Each cortical unit (201 and 201a-201h) has a set of functions producing output represented as data variables $N_0$-$N_{15}$. Cortical unit 201 interacts with one or more neighboring cortical units (201a-201h) through data variables $D_0$-$D_{15}$. Data variables $D_0$-$D_{15}$ correspond to the outputs $N_0$-$N_{15}$ from neighboring cortical units (201a-201h). For instance, data variables $N_4$ and $N_5$ of neighboring cortical unit 201g correspond to data variables $D_4$ and $D_5$ of cortical unit 201. Likewise, data variables $N_{12}$ and $N_{13}$ of cortical unit 201 correspond to data variables $D_{12}$ and $D_{13}$ of neighboring cortical unit 201g. Referring to FIG. 2b, an expanded view of cortical units as a large two-dimensional array of cortical units according to an embodiment of the present invention is shown.

While FIGS. 2a and 2b show a two-dimensional array with each cortical unit having eight neighbors, clearly any arrangement, with any number of dimensions and any number of neighbors, and any pattern of relationships between one cortical unit's data variables and another's data values, such as cortical units arranged in non-array forms, would be possible. Additionally, while data variables $N_0$-$N_{15}$ represent the output from a set of 16 functions, clearly any number of functions may be configured in a cortical unit.

A function includes terminals, also known as data variables, and operators, which perform calculations on the terminals and on the results of other calculations. Each function may be represented as a nested parenthetical expression of terminals and operators. For example, the function (ABS ((X+2) EXP NR)) contains the terminals for environmental input, negative reinforcement, and the number two, and the operators for absolute value, addition, and exponent. Some of the operators set the values of other variables (e.g., STY sets the value of Y).

In one embodiment, the functions are represented as mathematical expression trees, such as those employed in the artificial evolution subfield of genetic programming (GP).

Specifically, a mathematical expression describing the neural output function is cannibalized into a standard form (such as nested parenthetical statements) and represented as a tree structure of internal nodes and leaf nodes corresponding to the cannibalized form. Internal nodes correspond to mathematical operators, which apply a function or other mathematical operation to the values from nodes directly below the internal node. Leaf nodes are on the bottom of the tree, and they represent constants, variables, and other terminals input into the mathematical expression tree.

The set of terminals that can be used in leaf nodes and the set of operators for internal nodes are preferably both simple and general enough to allow the evolution of a diverse variety of mappings from function input to function output. One possible embodiment of the terminal set and the operator set according to the present invention is summarized in TABLE 1 and TABLE 2, respectively. However, almost any kind of terminal or operator, and any combination thereof, would be suitable for these functions, and furthermore, any manner of implementing a function, whether neural elements, strings of computer code, parse trees or something else would be suitable.

TABLE 1

| SYMBOL | TERMINAL |
|---|---|
| X | External input |
| Y | External output |
| $D_0, D_1, \ldots, D_n$ | Dendritic inputs |
| $N_0, N_1, \ldots, N_n$ | Dendritic outputs |
| PR | Positive reinforcement |
| NR | Negative reinforcement |
| R1, R2 | Registers |
| RI | Random integer |
| $0, 1, \ldots, 9$ | Integers |

In TABLE 1, the terminal set contains integers and system variables that may be incorporated into the processing calculations. The terminal set includes positive reinforcement (PR) and negative reinforcement (NR) signals that may be used to help train the network.

TABLE 2

| SYMBOL | OPERATOR |
|---|---|
| + | $y = a + b$ |
| − | $y = a - b$ |
| * | $y = a \times b$ |
| % | $y = \{a/b \text{ if } b \neq 0; 1 \text{ if } b = 0\}$ |
| MOD | $y = a$ modulo $b$ |
| EXP | $y = a^b$ |
| NEG | $y = -a$ |
| ABS | $y = |a|$ |
| LIN | $y = b \times a + 0.5$ ($y \in [0, 1]$) |
| SIG | $y = 1/(1 + e^{-b \times a})^{-1}$ |
| TRI | $y = 1 - |b \times a|$ ($y > 0$) |
| RAD | $y = e^{-(b \times a)2}$ |
| THR | $y = \{0 \text{ if } a < b; a \text{ if } a \geq b\}$ |
| STP | $y = \{0 \text{ if } a < b; 1 \text{ if } a \geq b\}$ |
| ST1, ST2 | $y = a;$ R1, R2 = a |
| STY | $y = a;$ Y = a |

The operator set in TABLE 2 contains arithmetic operators and nonlinear operators that can collectively serve as the building blocks for a great variety of neural processing functions. In TABLE 2, argument a is considered the main input to the operator, and b is considered a modulating parameter that shapes of the operator's output curve (e.g., the slopes in the LIN, SIG, TRI and RAD functions) and the threshold of the THR and STP operations.

Figure 4:
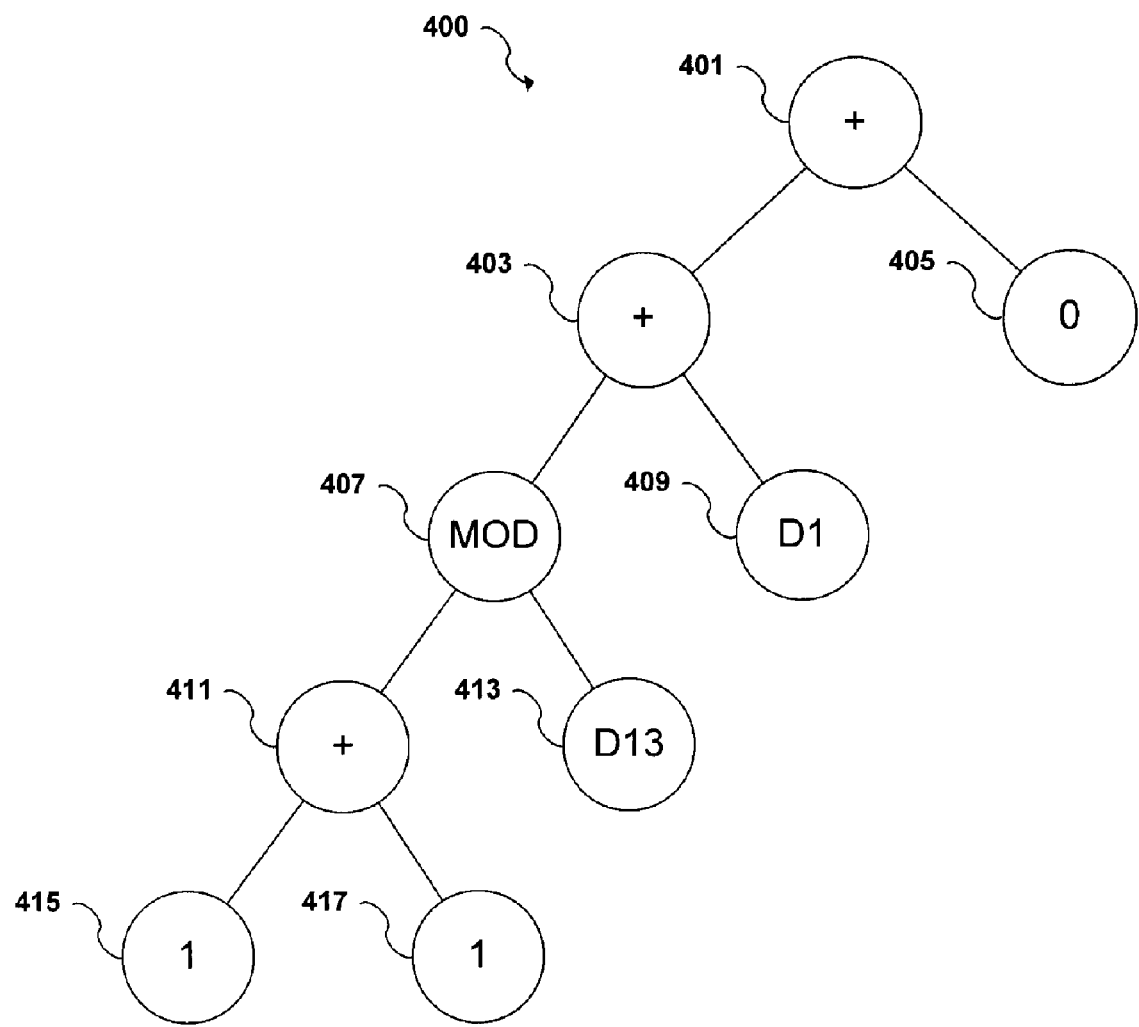
FIG. 4 illustrates an expression tree for a function of a cortical unit according to an embodiment of the present invention.

Referring to FIG. 4, a mathematical expression tree 400 representing the function 303 according to an embodiment of the present invention is shown. Specifically, the fully parenthesized canonical expression: (0+(((1+1) MOD D13)+D1)), may be represented by the mathematical expression tree 400. Mathematical expression tree 400 includes internal node 401, which contains the+operator that operates on values from internal node 403 and 0 in leaf node 405. The internal node 403 contains the+operator and operates on values from internal node 407 and leaf node 409 (holding the D1 terminal). The internal node 407 encodes the MOD function, operating on values from leaf node 413 (holding the D13 terminal) and internal node 411. The internal node 411 contains the+operator that operates on 1 in leaf node 415 and 1 in leaf node 417.

Regardless of the form of the functions, they must be subject to the evolutionary forces of mutation, reproduction, and selection. Evolution involves mutation, and one advantage of representing functions as mathematical expression trees is that every possible tree is a syntactically valid expression. This feature improves the efficiency of the evolutionary process, since mutations result in valid processing functions, a distinct advantage over biological evolution, in which mutations can result in non-viable offspring.

Figure 5:
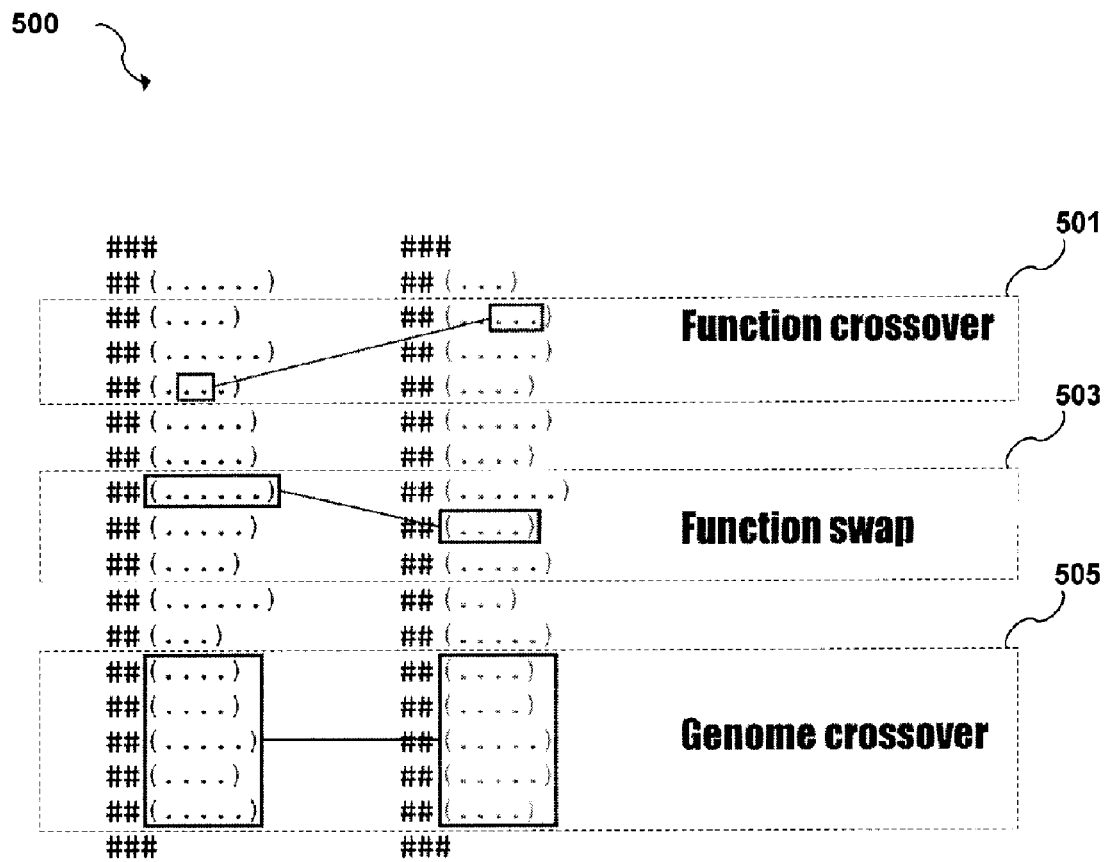
FIG. 5 illustrates function mutations according to an embodiment of the present invention.
Figure 6:
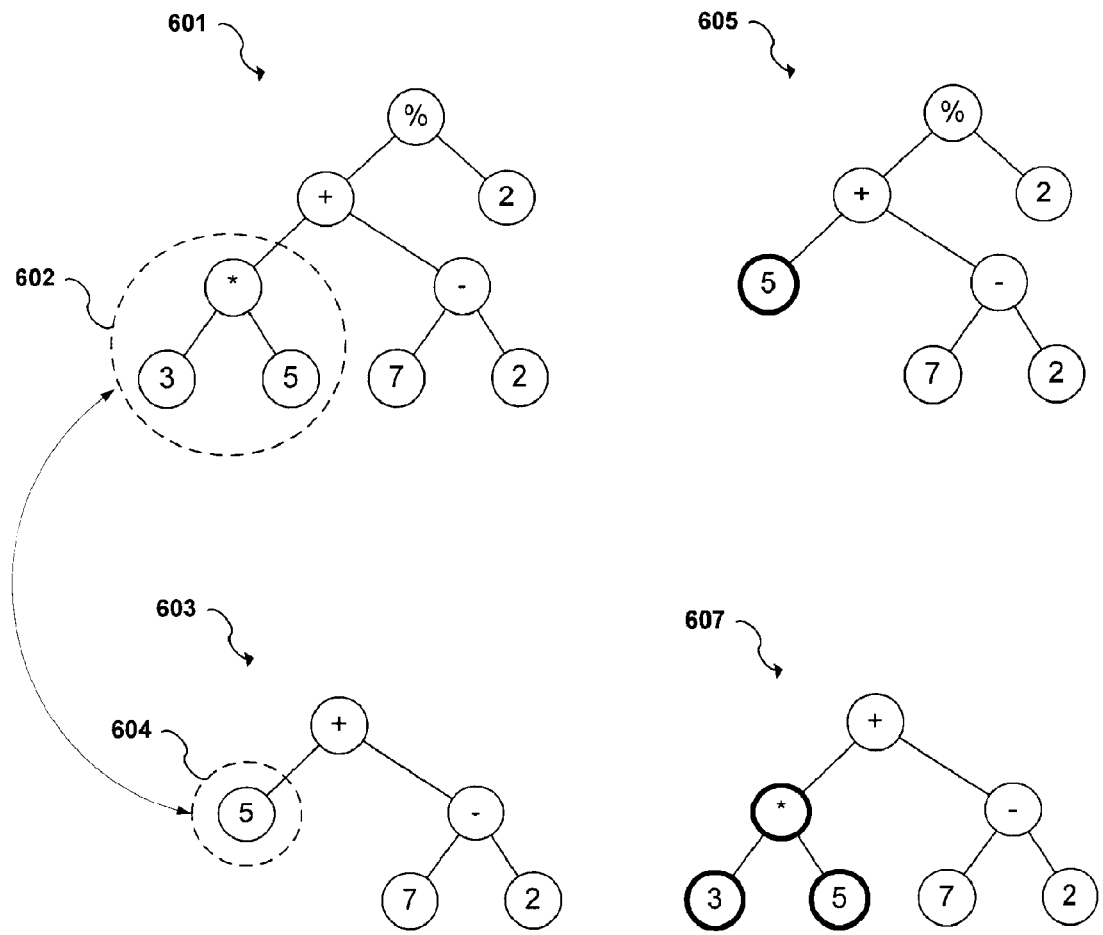
FIG. 6 illustrates a function cross-over mutation of FIG. 5 according to an embodiment of the present invention.

Referring to FIG. 5, several mutations of one or more functions of a genome according to an embodiment of the present invention are shown. The "###" signifies the start and end of a genome, "##" prefixes the functions, and "( . . . )" signifies a nested parenthetical expression. There are several types of mutation operations that can be performed on genomes including but not limited to function crossover mutation 501, function swap mutation 503, and genome crossover mutation 505. Function crossover mutations create a reciprocal exchange of respective portions of functions between two functions, producing offspring that are a mixture the two functions. As shown in FIGS. 5 and 6, in a function crossover mutation, random branch clusters (602, 604) from within each function mathematical expression tree (601, 603) are exchanged to produce two derivative trees (605, 607). In a function swap mutation 503, a function (e.g., function 303 shown in FIG. 3) is swapped with a function in another genome. In a genome crossover mutation 505, segments of a genome are exchanged for segments in another genome.

With this repertoire of terminals and functions, and mutation thereof, a diverse variety of potential mappings can be created, enabling virtual populations to evolve and optimize novel types of functions.

The virtual evolution process as previously described and as shown in FIG. 1a enables the evolution of a wide range of function circuitry, and many combinations of different circuitries can exist within the same cortical unit, enabling different regions of the cortical unit to evolve for separate processing tasks. Cortical units can have different modular components, with different levels of complexity in their interrelationships, just as the function themselves can evolve different output functions and types of connections between them. Thus, cortical units are capable of evolving to be as intricate and hierarchically complex as the demands on their intelligence require them to be.

III. Fitness Regimes

Natural selection is about survival of the fittest, and selection in one aspect of the invention is about survival of the smartest. Referring back to FIG. 1a, populations of cortices compete in a series of trials at block 105. In each trial the cortices are trained to do tasks that require some degree of intelligence, and how well each cortex can be trained to perform that task determines whether its corresponding genome survives until the next generation. Once the population has evolved to pass the trial, the population moves on to the next one. Each new trial builds a new aspect of intelligence, so with each completed trial the cortices become more and more intelligent.

What is important in the design of the fitness regimes is that cortices are not being evolved that can perform certain tasks, but rather that can be trained to perform certain tasks. In most artificial evolution projects, on the other hand, every candidate solution is ready to be implemented, and each candidate is selected on the basis of how well the solution works. The cortical units developed according to this aspect of the invention, however, each begin life as a blank slate, needing to be trained before becoming useful but are more versatile and powerful than the rigid structures conventionally produced by artificial evolution.

The methods used for training a cortex can be different from those used to train conventional artificial neural networks. Artificial neural networks are trained by an elaborate series of calculations that very gradually modify all the internal weights until the network's outputs are correct. These methods have many limitations, the main one being that any artificial neural network that is trained in this manner is not capable of learning anything new. No matter how well the artificial neural networks have been trained, they do not learn from experience nor apply what they have "learned" to new situations.

Learning means altering the cortical processing dynamics until the correct behavior is achieved. In order to train a cortex, a user applies positive and negative reinforcement signals according to whether the cortical outputs are desired or not. The ability to remember behaviors that elicit positive reinforcement, and quickly alter behaviors that elicit negative reinforcement, is a fundamental evolutionary objective of these cortices. In this embodiment, the cortex operates on negative reinforcement (NR) and positive reinforcement (PR) signals. Optionally, reinforcement signals may be applied to all cortical units, or only to those associated with particular environmental data inputs.

Training methods for cortices can be both simpler and more powerful than those employed for conventional artificial neural networks. For example, cortices can be trained using Skinnerian behavioral conditioning: when an output is desirable a positive reinforcement (PR) signal is sent, and when an output is undesirable a negative reinforcement (NR) signal is sent. These cortices have access to environmental feedback, and the cortices most responsive to environmental feedback are those best able to learn, optimize, and maintain a sophisticated repertoire of positive-reinforcement-seeking and negative-reinforcement-avoiding behaviors.

In one embodiment, fitness may be measured directly using the formula:

$$F = \sum_{t \in 0 \ldots T} (PR_t - NR_t)$$

where $PR_t$ and $NR_t$ are the positive and negative reinforcement signals, respectively, received at time step t, and T is the total number of time steps allotted for each cortex to master its current trial. The highest scoring cortices are culled at the end of every generation (block 107), and seed the next generation of slightly-more intelligent genomes via blocks 113 and 115. Alternatively, fitness can be measured based on performance in the fitness regime relative to other cortices.

The described evolutionary system can help find better mechanisms. Negative reinforcement and positive reinforcement are important components of the functions, and the functions can find different ways of incorporating the components into their calculations. Those calculations that cause their cortices to better remember behaviors that elicit positive reinforcement and more quickly replace behaviors that elicit negative reinforcement, have a selective advantage. After many generations, the genomes can be used to create exceptionally well trainable cortices.

Each cortex can periodically be tested for training on its previous trials, helping to ensure that the cortices do not lose their accumulated adaptations. This also means that the same kinds of cortices have to be trainable in many different environments and must be able to learn to process many different kinds of neural input.

Accordingly, the possible selection trials may contain many different types of perceptual problems. Some of the problems can be spatially dynamic, and some can be temporally dynamic. Some can require memorization of the input, and some can require the detailed discrimination of a few critical patterns. Some can require detailed analysis, and some can require rapid decision-making. Successful functions preferably cope with all of these situations.

The processing tasks in the selection trials are designed with one feature in common: intelligence. Of course, early trials need not require very much intelligence, but as increasingly more difficult trials are passed, the cortices become more capable. With each new selective challenge, the cortices develop more sophistication for making sense of increasingly complex environmental demands. None of these tasks, however, need require brute force computation; that is what conventional computers do well. On the other hand, the tasks performed in the selection trials are to elicit, not brute force, but intelligence, learning to analyze data, identify patterns, draw analogies, predict consequences, and make decisions.

Completion of the trials indicates that the cortices are ready to take the next evolutionary step: the real world. The market can mostly determine selection requirements from then on, and cortices can evolve to fulfill their needs. By that time, the cortices are capable of learning new skills that require intelligence.

Additional trials can be employed as steps on the path to intelligence, with objectives that are trainable and practical. For example, one objective is the ability to learn when the consequences (i.e., positive and negative reinforcement) of a given action are not felt until much later. Another objective is a detailed and patterned long-term memory.

IV. Solving The Inverted Pendulum Problem

One embodiment of the present invention can be used to solve the famous inverted pendulum problem in engineering. In the classic one-dimensional version of this problem, a pendulum hinged to a wheeled cart is to be balanced upright by jostling the cart from side to side. This system is highly dynamic and nonlinear. The system is also very unstable. One miscue and the pendulum will come crashing down.

This problem is also more than just an academic exercise in control theory. Inverted pendulum-like problems are found in applications as diverse as robotics, SEGWAY™ Human Transporters, and offshore drilling platforms. A version of this problem is even found in rocket science: when a rocket launches into the sky, the rocket has to be kept precisely balanced on top of its thrust vector or it will tumble out of control. Some of the solutions are very sophisticated. The space shuttle's vector control system monitors the ship's position and, if necessary, fires corrective bursts from a set of gimbaled thrusters, once every twenty milliseconds during the entire ascent.

Control theorists have developed many different kinds of inverted pendulum solutions, using traditional engineering algorithms, genetic algorithms, fuzzy logic systems, expert systems, and artificial neural networks. All of these methods work well, with one important limitation: any solutions generated by them can only work for a very specific set of problem conditions. If some aspect of the problem changes, a new solution must be generated based on the new parameters. The solutions neither learn from experience nor apply what they've learned to new situations.

For example, an inverted pendulum application may suddenly be tasked with balancing a different mass, or length, or be placed on an incline, or it may encounter sustained gusts of wind, or friction on the ground or in the hinge, or obstacles in its way. Any number of new situations might arise, including wear and tear in the parts of the controlling mechanism itself, and every one of the methods mentioned above would likely fail. An intelligent controller should be able to cope with change.

Cortices evolved for intelligence by embodiments of the invention do not stop learning and are ready for anything new. The inverted pendulum trials develop this capability, and in the context of a complex task. The first few trials are very simplified virtual versions of the problem. Later versions become increasingly difficult and increasingly dynamic. Cortices that can pass these trials demonstrate a fundamental aspect of intelligent behavior, applied in a very useful way.

A. Inverted Pendulum Trial One

The first goal is to breed cortices that respond to positive and negative reinforcement. The reinforcement signals used to train the cortices to master a simplified version of the inverted pendulum problem are summarized in TABLE 3.

TABLE 3

| INPUT | OUTPUT | | |
|---|---|---|---|
| | <0 | 0 | >0 |
| 10 | P | N | N |
| 01 | N | N | P |

Each cortical unit has two input variables: one left and one right. At any instant, the value of those inputs will indicate the direction the pendulum is leaning: a 1 on the left means it is leaning left, a 1 on the right means it is leaning right. The output variables will indicate which way the cortical unit wants to move the cart: any value less than zero means push left, any value greater than zero means push right. These assignments may be changed around fairly often to make sure cortices are not evolved that can only learn this specific table. The entries in the table indicate which reinforcement signals are sent to the cortical unit as a result of its actions: a P means positive (PR=1 and NR=0), an N means negative (PR=0 and NR=1).

As with other selection trials, the cortices that remember actions that generate positive reinforcement and avoid actions that generate negative reinforcement are the ones selected at the end of generation. These are the cortices that best know how to learn.

B. Inverted Pendulum Trial Two

In this trial a new factor is introduced for the cortical units to take into consideration: the angular velocity of the pendulum. Deciding how to move the cart now involves determining the magnitude of the push in addition to the direction of the push. This trial, therefore, is more complicated than the previous trial.

The cortical units have two input variables for this trial, one for the pendulum's angle and one for its velocity, and their outputs will be interpreted as before (less than zero means push one way, greater than zero means push the other).

The trial has two parts. For the first few generations, the inputs only have three possible values. When the cortices have mastered this many, the number will increase, e.g., to five. When the cortical units push to keep the pendulum centered, they receive positive reinforcement; but if they push the wrong way, the pendulum will drop and they receive negative reinforcement. The calculations generated for a table of data for this trial can be based on a set of standard test parameters used by control theorists to gauge the quality of their inverted pendulum controllers.

C. Inverted Pendulum Trial Three

From this trial onwards, the input values can be any number within the problem domain; no longer just two, three, or five possibilities but the precise pendulum angle and angular velocity. This trial also has a different reinforcement regime. In the first two trials the cortices were conditioned based on their actions, but from this trial on the cortices are conditioned based on the results of their actions, namely how well the pendulum is kept in balance. Positive reinforcement is given whenever the vertical angle is less than three degrees, and then in relation to the pendulum's proximity to the apex. Negative reinforcement is given whenever the angle is greater than three degrees, and then in relation to the pendulum's distance from the apex. At first the pendulum is constrained from swinging more than fifteen degrees to either side, but as the cortices get collectively smarter, the constraints are relaxed and conditions are made increasingly difficult.

D. Inverted Pendulum Trial Four

In this trial, two additional input variables are used: one for the cart position, and one for the cart velocity. These inputs, together with pendulum angle and pendulum velocity, provide each cortex with the full state of the pendulum to control. The cart position is important because, starting with this trial, limits are placed on the track: the carts cannot be pushed past 2.4 meters to either side of the track center (2.4 meters being the standard track limit used for inverted pendulum benchmarks). Because of the boundaries, there are times when the correct action given the position and velocity of the pendulum might not be possible given the position and velocity of the cart. Successful cortices are those trainable for planning their actions.

E. Inverted Pendulum Trial Five

With this trial the cortices become competitive with the state of the art, but they need to learn one more trick: from now on, they are to keep the cart as close as possible to the center of the track. So there are two objectives: centering the pendulum on the cart and centering the cart on the track, and both objectives and all four variables must be kept in mind when deciding what to do.

With two objectives, there are two reinforcement regimes. This means that at times the cortices will receive positive reinforcement for success at one of the objectives concurrently with negative reinforcement for failure at the other. And with success or failure at both, the two signals are summed together. The sum of each type of signal may range between zero and one (for consistency from trial to trial), but within that constraint the reinforcement can be apportioned in any way. An off-center pendulum may be considered worse than an off-center cart, since the pendulum is more difficult to rectify. So negative reinforcement is applied more strongly for the pendulum angle than for the cart position.

After mastering this trial, the cortices are put though standard inverted pendulum benchmark tests, with qualitative and quantitative measures of performance. Of course, these benchmarks do not test for learning how to respond to changing problem conditions, because none of the existing solutions can do that. This is what the next trial is for, and where dramatic improvement over other types of controllers lies.

F. Inverted Pendulum Trial Six

In this trial, cortices learn to control the actuator circuits regulating the robotic manipulator arm of a simulated future version of NASA's Near-Earth Asteroid Rendezvous mission. The cortices are tested on handling all sorts of changing conditions, from changes in pendulum length (as the robot extends and contracts its arm), mass (when the arm grabs objects of different weights), roving environment (as it encounters obstacles and hills), and gravity intensity (when exploring different asteroids or flying through space). An occasional solar flare or flying neutrino may cause a short circuit in some part of the mechanical arm and cause the actuators to behave erratically.

The cortical units have access to four streams of information: the pendulum angle, the pendulum velocity, the cart position, and the cart velocity, plus positive and negative reinforcement feedback. When something is not working right, the cortical units know it and what to do about it.

More trials can be designed. There are many possibilities. For example, reinforcement signals can be provided only for complete success or total failure, anything in between and the cortical units do not have any feedback; or, some of the input such as the angular velocity and cart velocity data, can be withheld, requiring cortical units to infer their values by monitoring how the angle and cart positions change over time. They can also be trained to apply variable forces to the cart, instead of always applying all-or-nothing.

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise than as specifically described.

What is claimed is:

1. A computer implemented method for developing artificial intelligence though the generational evolution of one or more genomes, wherein each genome comprises a set of functions, the method comprising:
    creating one or more cortices, wherein each cortex comprises a plurality of cortical units, each cortical unit is created from one or more genomes, and wherein the one or more genomes provide the method for creating each cortical unit;
    operating the one or more cortices to perform one or more specified tasks;
    calculating a fitness score for each cortex based on its ability to perform the specified tasks; and
    selecting one or more of the cortices based on the respective fitness scores.

2. The computer implemented method of claim 1, wherein each of the plurality of cortical units in the cortex is created from the same genome.

3. The computer implemented method of claim 2, further comprising:
    reproducing one or more of the genomes based on the fitness score of the corresponding cortex; and
    mutating one or more of the functions of the one or more genomes.

4. The computer implemented method of claim 1, further comprising providing positive and negative reinforcement to one or more cortical units based on the performance of the cortex.

5. The computer implemented method of claim 4, wherein the selected cortices are those with the highest accumulated ratio of positive to negative reinforcement.

6. The computer implemented method of claim 3, wherein mutating one or more of the functions results in altering the cortical processing dynamics of one or more of the cortices.

7. The computer implemented method of claim 1, wherein the functions of the cortical units are represented by neural processing elements.

8. The computer implemented method of claim 1, wherein the functions of the cortical units are represented by parse trees.

9. The computer implemented method of claim 1, wherein the functions of the cortical units are represented by mathematical expression frees, each mathematical expression tree having internal nodes and leaf nodes, the internal nodes representing a set of mathematical operators, and the leaf nodes representing a set of terminal inputs to the respect mathematical expression tree.

10. The computer implemented method of claim 1, wherein the functions of the cortical units are represented by strings of computer code.

11. The computer implemented method of claim 1, wherein the functions of the cortical units comprise nested parenthetical expressions of terminals and operators, and wherein the operators perform calculations on the terminals and the results of other calculations.

12. The computer implemented method of claim 2, wherein data is provided to the cortical units through neural connections.

13. The computer implemented method of claim 2, wherein data is provided to the cortical units by designating input variables upon which the functions may operate.

14. The computer implemented method of claim 2, wherein the cortical units are arranged as an array with each cortical unit having a plurality of neighboring cortical units.

15. The computer implemented method of claim 14, wherein each cortical unit includes data that is available to one or more of the functions, the method further comprising exchanging the data from one or more of the cortical units with one or more of the neighboring cortical units.

16. The computer implemented method of claim 15, wherein the data from one or more of the cortical units is continuously processed and exchanged with the one or more neighboring cortical units in all directions.

17. The computer implemented method of claim 15, wherein the data is exchanged through neural connections.

18. The computer implemented method of claim 15, wherein the data is exchanged by allowing one or more neighboring cortical units direct access to the internal data.

19. The computer implemented method of claim 14, wherein each cortical unit is associated with eight neighboring cortical units.

20. The computer implemented method of claim 14, wherein the array comprises a multi-dimensional array.

21. The computer implemented method of claim 20, wherein the array comprises a two-dimensional array.

22. The computer implemented method of claim 21 wherein one or both pairs of opposing edges of the array connect to form a tube or torus shaped network.

23. The computer implemented method of claim 15, wherein the data of one or more of the cortical units is distinctive from the data of other cortical units.

24. The computer implemented method of claim 15, wherein the data for each of the cortical units comprises a first plurality of return values from the one or more functions.

25. The computer implemented method of claim 24, wherein the data for each of the cortical units further comprises a second plurality of return values from one or more of the functions of the one or more neighboring cortical units.

26. The computer implemented method of claim 25, wherein the first and second plurality of returned values are provided as input parameters to the one or more functions.

27. The computer implemented method of claim 4, wherein each of the functions of the cortical units operate based on positive and negative reinforcement as input parameters to the functions.

28. The computer implemented method of claim 3, wherein mutating one or more of the functions is further based on a mutation probability rate.

29. The computer implemented method of claim 3, wherein mutating one or more of the functions comprises at least one of a function crossover mutation, a function swap mutation, and a genome crossover mutation.

30. The computer implemented method of claim 29, wherein the function crossover mutation is based on a first mutation probability rate, the function swap mutation is based on a second mutation probability rate, and the genome crossover mutation is based on a third mutation probability rate.

31. The computer implemented method of claim 30, further comprising mutating at least one of the first, second and third mutation probability rates.

32. A computer program embodied on a computer readable medium for developing artificial intelligence through the generational evolution of one or more genomes, wherein each genome comprises a set of functions, the computer program comprising:
a first computer code for creating one or more cortices, wherein each cortex comprises a plurality of cortical units, each cortical unit is created from one or more genomes, and wherein the one or more genomes provide the method for creating each cortical unit;
a second computer code for operating the one or more cortices to perform one or more specified tasks;
a third computer code for calculating a fitness score for each cortex based on its ability to perform the specified tasks; and
a forth computer code for selecting one or more of the cortices based on the respective fitness scores.

33. The computer program of claim 32, wherein each of the plurality of cortical units in the cortex is created from the same genome.

34. The computer program of claim 33, further comprising:
a fifth computer code for reproducing one or more of the genomes based on the fitness score of the corresponding cortex; and
a sixth computer code for mutating one or more of the functions of the one or more genomes.

35. A computer system for developing artificial intelligence through the generational evolution of one or more genomes, wherein each genome comprises a set of functions, the computer system comprising:
one or more processors; and
a computer readable medium connected to the processors, the computer readable medium including processor instructions configured to be read by the processors and thereby cause the processors to:
create one or more cortices, wherein each cortex comprises a plurality of cortical units, each cortical unit is created from one or more genomes, and wherein the one or more genomes provide the method for creating each cortical unit;
operate the one or more cortices to perform one or more specified tasks;
calculate a fitness score for each cortex based on its ability to perform the specified tasks; and
select one or more of the cortices based on the respective fitness scores.

36. The computer system of claim 35, wherein each of the plurality of cortical units in the cortex is created from the same genome.

37. The computer system of claim 36, wherein the computer readable medium further includes processor instructions configured to be read by the processors and thereby further cause the processors to:
reproduce one or more of the genomes based on the fitness score of the corresponding cortex; and
mutate one or more of the functions of the one or more genomes.

38. A computer implemented method for developing artificial intelligence through the generational evolution of one or more sets of functions, comprising:
creating one or more first objects, wherein each first object comprises a plurality of second objects, each second object is created from one or more genomes. and wherein the one or more genomes provide the method for creating each second object;
operating the first objects to perform one or more specified tasks, wherein a fitness score is calculated for each first object based on its ability to perform the specified tasks;
reproducing one or more of the genomes, wherein each genome is reproduced based on the fitness scores of the corresponding first objects that have second objects created by that genome; and
mutating one or more functions of the one or more genomes.

39. The method of claim 38, wherein mutating one or more of the functions results in altering the processing dynamics of one or more of the first objects.

40. A computer implemented method for developing artificial intelligence through the generational evolution of one or more genomes, wherein each genome comprises a set of functions, the method comprising:
creating one or more cortices, wherein each cortex comprises a plurality of cortical units, each cortical unit is created from one or more genomes, and wherein the one or more genomes provide the method for creating each cortical unit;
operating the one or more cortices to perform one or more specified tasks;
calculating a fitness score for each cortex based on its ability to perform the specified tasks;

selecting one or more of the cortices based on the respective fitness scores;
reproducing one or more of the genomes based on the fitness score of the corresponding cortex; and
mutating one or more of the functions of the one or more genomes.

* * * * *